(12) United States Patent
Summer et al.

(10) Patent No.: US 7,430,907 B2
(45) Date of Patent: Oct. 7, 2008

(54) HYDROMETER/FLUID LEVEL SENSOR

(75) Inventors: Mark J. Summer, Frankfort, IL (US); Martin A. Witt, Tinley Park, IL (US)

(73) Assignee: Illinois Tool Works Inc., Glenview, IL (US)

( * ) Notice: Subject to any disclaimer, the term of this patent is extended or adjusted under 35 U.S.C. 154(b) by 51 days.

(21) Appl. No.: 11/637,587

(22) Filed: Dec. 12, 2006

(65) Prior Publication Data

US 2007/0113645 A1 May 24, 2007

Related U.S. Application Data

(63) Continuation-in-part of application No. 11/103,707, filed on Apr. 12, 2005, now Pat. No. 7,228,737.

(60) Provisional application No. 60/599,796, filed on Aug. 6, 2004, provisional application No. 60/776,774, filed on Feb. 24, 2006, provisional application No. 60/789,097, filed on Apr. 4, 2006.

(51) Int. Cl.
*G01N 9/00* (2006.01)

(52) U.S. Cl. ........................................ 73/447

(58) Field of Classification Search ............... 215/335; 73/444, 447, 451; 429/91
See application file for complete search history.

(56) References Cited

U.S. PATENT DOCUMENTS

| 3,383,917 | A |   | 5/1968  | Ryder et al. |
|-----------|---|---|---------|--------------|
| 3,417,614 | A |   | 12/1968 | Ryder et al. |
| 3,597,972 | A |   | 8/1971  | Ryder et al. |
| 3,893,339 | A |   | 7/1975  | Melone |
| 3,895,964 | A |   | 7/1975  | Sakamoto |
| 3,954,010 | A |   | 5/1976  | Hiblom |
| 4,074,025 | A | * | 2/1978  | Miyagawa ............ 429/91 |
| 4,240,282 | A |   | 12/1980 | Nelson |
| 4,308,817 | A | * | 1/1982  | Peterson ............. 116/215 |
| 4,358,032 | A | * | 11/1982 | Libit ................. 222/498 |
| 5,180,643 | A | * | 1/1993  | Nedbal ............... 429/91 |
| 5,811,203 | A | * | 9/1998  | Kono et al. .......... 429/91 |
| 6,393,910 | B1|   | 5/2002  | Korb et al. |
| 2006/0027018 | A1 | | 2/2006 | Summer et al. |

FOREIGN PATENT DOCUMENTS

DE            9101356           5/1991

\* cited by examiner

*Primary Examiner*—John Fitzgerald
(74) *Attorney, Agent, or Firm*—Mark W. Croll; Paul F. Donovan

(57) ABSTRACT

A battery and battery condition indicator are provided with a seal as monolithic structures whereby the indicator is inserted in an opening in the battery and sealed there against via ribs in the battery confronted by a surface of the indicator and/or ribs on the indicator embedded in a surface of the battery defining the opening.

16 Claims, 2 Drawing Sheets

HYDROMETER/FLUID LEVEL SENSOR

CROSS-REFERENCE TO RELATED APPLICATIONS

This application is a continuation-in-part of U.S. Ser. No. 11/103,707, now U.S. Pat. No. 7,228,737, filed on Apr. 12, 2005, which claimed the benefits of U.S. Provisional Application Ser. No. 60/599,796, filed on Aug. 6, 2004; and this application further claims the benefits of U.S. Provisional Application Ser. No. 60/776,774, filed on Feb. 24, 2006, and U.S. Provisional Application Ser. No. 60/789,097 filed on Apr. 4, 2006.

FIELD OF THE INVENTION

The present invention relates generally to hydrometers and fluid level sensors in storage batteries; and more particularly, the invention pertains to the structures for establishing a seal between the device and the storage battery opening in which it is held.

BACKGROUND OF THE INVENTION

Battery condition indicators are used in lead/acid storage batteries of many types, including those installed in motor vehicles. Known battery condition indicators function as hydrometers detecting changes in the specific gravity indicative of the electrical charge condition of the battery, and provide a visual indication of the charge condition. Battery condition indicators also can detect changes in the electrolyte level in the battery and provide a visual indication if the electrolyte level is below a predetermined minimum level. It is known to provide both charge condition and electrolyte level detection functions in the same battery condition indicator.

A known battery condition indicator is inserted in an opening through the cover for the cell of a battery and provides a head with a visual window for looking into the indicator. A cage or box is immersed in the fluid electrolyte, if the battery is adequately filled. One or more floatable indicator body is contained in a channel or channels in the cage and responds to different battery conditions to rise or fall in the channels. A light-transmissive rod extends between the head of the indicator and the cage with the floatable bodies. A conical tip at the end of the light-transmissive rod has a tip adjacent the channels in which the one or more floatable bodies move. The floatable bodies are of different colors to provide different visual cues when visible through the indicator. A battery condition indicator having one floatable body can provide visual cues for a satisfactorily charged battery with satisfactory electrolyte level, a different visual cue for a satisfactory electrolyte level but a low battery charge and a third cue if the electrolyte level is low. By providing more floatable bodies responsive to different specific gravities, high and low fluid levels can be indicated as well as low, fair and satisfactory electric charge.

Battery condition indicators as described have worked well, but are not without disadvantages. Installation of the indicator in a battery cover is known use an additional component in the way of a gasket or malleable collar to seal the interface between the indicator and the battery cover opening in which it is installed. The use of multiple components complicates installation. A relatively large hole is required in the battery cover to accommodate the indicator and a separate, independent seal associated with the indicator and the opening in the battery. The requirement for a relatively large opening limits the available locations for the indicator in the battery. Further, if intimate contact is lost along a portion of the seal, contaminate infiltration or leakage can occur. It is known to perform a wash cycle during a late stage in the manufacture of a battery, and wash water can be trapped in small crevices, such as around the indicator. During subsequent battery handling, seepage of the trapped wash water can give an erroneous impression that the battery has leaked, leading to retesting and/or re-processing the battery.

SUMMARY OF THE INVENTION

The present invention provides a battery condition indicator with an integral seal configuration as part of the indicator.

In one aspect thereof, the present invention provides a fluid container with an outer element defining an opening and an indicator for indicating a condition of a fluid in the container. The indicator is disposed in the opening and includes a response assembly, an indicator head at which exhibited changes are visualized and a light transmissive body connecting the response assembly and the indicator head. Sealing structures established between the indicator and the outer element include a plurality of ribs integral with the indicator and/or the outer element. The indicator head and the indicator body are made of a first material and the outer element is made of a second material, the second material being softer than the first material. The plurality of ribs includes a rib embedded in the outer element and/or crushed by the indicator.

In another aspect thereof, the present invention provides a battery condition indicator with a response assembly, a light transmissive body attached to the response assembly, a head at an end of the light transmissive body opposite the response assembly; and at least one circumferential sealing rib disposed on the body between the head and the response assembly. The rib includes an outermost sealing surface, a lead-in face adjacent the sealing surface and directed toward the response assembly, and a trailing face adjacent the sealing surface and directed toward the head. The lead-in face is sloped more gradually than the trailing face.

In a still further aspect thereof, the present invention provides a vehicle battery with a battery cover defining an opening, a lip inwardly of an outer surface of the opening and a bore extending through the cover from the lip. At least one annular rib is disposed on the lip directed toward the opening. An electrolyte conditions indicator is disposed in the cover and includes a head disposed against the annular rib on the lip and a body extending inwardly in the battery from the head. The indicator body includes at least one circumferential rib at least partly embedded in the cover within the bore.

An advantage of the present invention is providing a seal as integral parts of a battery condition indicator and battery, thereby simplifying assembly and installation of the indicator in the battery.

Another advantage of the present invention is providing a battery condition indicator seal arrangement to facilitate location of the indicator in an optimal location in the battery.

Still another advantage of the present invention is providing a battery condition indicator which inhibits contaminant infiltration into the battery even under conditions in which the full seal integrity has been compromised.

Other features and advantages of the invention will become apparent to those skilled in the art upon review of the following detailed description, claims and drawings in which like numerals are used to designate like features.

Figure 1:
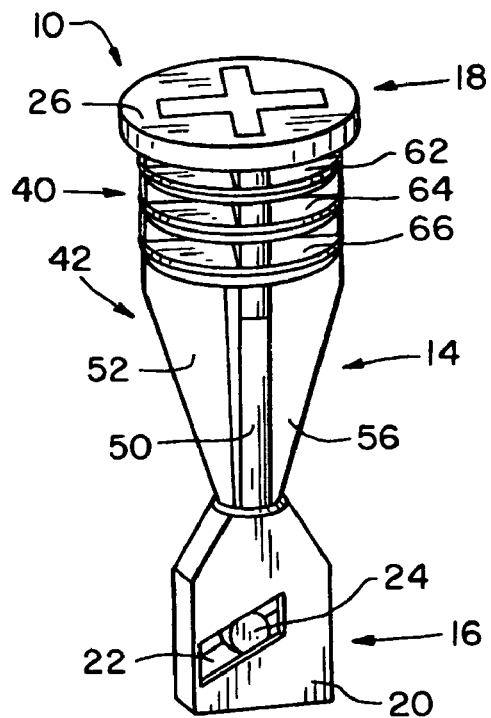
FIG. 1 is a perspective view of a battery condition indicator in accordance with the present invention.
Figure 2:
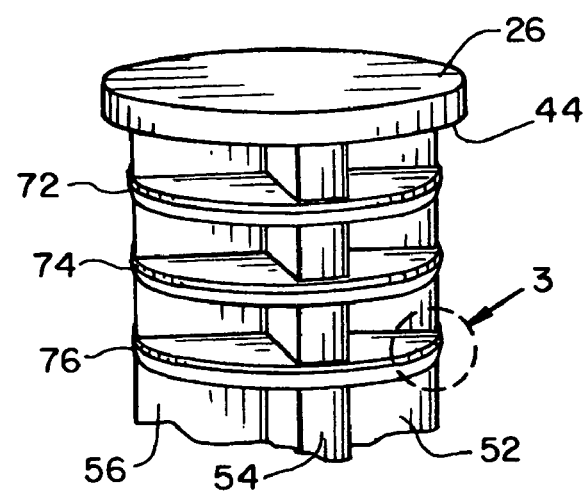
FIG. 2 is an enlarged view of the upper portion of the battery condition indicator shown in FIG. 1, showing the side opposite the side shown in FIG. 1.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 10 designates a fluid condition indicator, and, more specifically, a battery electrolyte condition indicator in accordance with the present invention. Indicator 10 is installed in a battery 12 (FIG. 4) to indicate the condition of electrolyte (not shown) in battery 12.

Indicators of the type to be described can be used in vessels or containers other than lead/acid storage batteries, although the use in such batteries is an advantageous use of the present invention. Indicators 10 can be used to detect fluid level changes in a variety of containers or vessels and also may be used to detect changes in other fluid conditions.

Indicator 10 includes a light transmissive body 14 between a response assembly 16 and a head 18. Light transmissive body 14 is formed of a light transmitting material such as, for example, acrylic, glass, styrene or other clear, partially clear or tinted material.

Response assembly 16 is connected to light transmissive body 14 and includes a cage or box 20 defining a trough or track 22 containing a floatable body 24. Track 22 has lower and higher portions relative to an end of body 14, allowing floatable body 24 to rise or fall in fluid in which it is immersed, depending on the specific gravity of the fluid and the surface level of the fluid.

As known to those skilled in the art, floatable body 24 moves along track 22 in response to changing conditions of a fluid in which it is placed. In response to pre-established changes in specific gravity, floatable body 24 may be adjacent or distant from an end or tip (not shown) of light transmissive body 14.

As those skilled in the art will understand readily, the present invention can be used with a variety of styles and configurations for response assembly 16. Thus, response assemblies having multiple floatable bodies and trough configurations of different shapes also can be used with the present invention, as can other styles, configurations and shapes for body 14.

Indicator head 18 defines a window 26 for peering into indicator 10. Head 18 can be a single piece of clear plastic or the like and can be formed as a monolithic body with light transmissive body 14.

Figure 3:
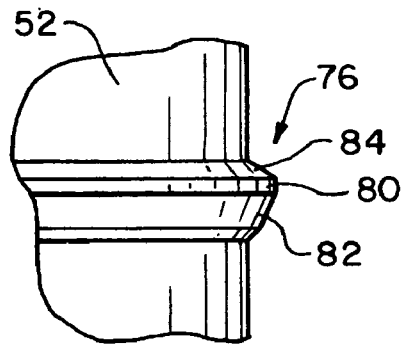
FIG. 3 is a further enlarged fragmentary portion of the battery condition indicator shown in FIGS. 1 and 2, the portion illustrated in FIG. 3 being that indicated by circle 3 in FIG. 2.

Body 14 in the exemplary embodiment includes a seal structure 40 and a tapering length 42 extending from seal structure 40 to response assembly 16. Head 18 is wider than seal structure 40 and provides a peripheral under surface 44 outwardly of seal structure 40. Body 14 includes four wings 50, 52, 54 and 56 in cruciate arrangement. Tapering length 42 of body 14 can be described as a cruciate cone or cruciate frustum with elongated tapering portions of wings 50, 52, 54 and 56. Seal structure 40 is a cruciate cylinder, including upper portions of wings 50, 52, 54 and 56 that are of substantially consistent diameter throughout the length of seal structure 40. Three spaced plate-like bodies 62, 64 and 66 defining circular perimeters and triangular-like gussets between adjacent wings 50, 52, 54 and 56 are provided at spaced locations along the length of seal structure 40. Each body 62, 64, 66 defines a circular outer edge or rib 72, 74, 76, respectively, encircling body 14 and disposed outwardly of outer edges of wings 50, 52, 54, 56. As seen most clearly in FIG. 3, each outer edge includes an outermost sealing surface 80, a lead-in face 82 with respect to the insertion of indicator 10 in battery 12 and a trailing face 84. Lead-in face 82 and trailing face 84 are adjacent opposite sides of outermost sealing surface 80. Lead-in face 82 is more gradually sloped than trailing face 84, thereby facilitating easy insertion of indicator 10 in battery 12.

While described herein as separate bodies or structures, it should be understood that wings 50, 52, 54 and 56, including the lower tapering portions thereof in tapering length 42 and the upper portions in seal structure 40, together with seal plates 62, 64, 66 can be provided as a single monolithic body formed in a mold. Accordingly, plates 62, 64 and 66 also can be described each as including triangular segments or gussets between wings 50, 52, 54 and 56, with an outer peripheral ring portion outwardly of wings 50, 52, 54 and 56.

The present invention can be used on indicator bodies of types other than that of the exemplary embodiment having four wings 50, 52, 54, 56. Bodies having more than four wings or less than four wings also can be used, as well as body types not having wings. While three seal bodies 62, 64, 66 have been shown and described in the exemplary embodiment, more than three or fewer than three seal bodies 62, 64, 66 can be used.

Battery 12 defines an opening 90 with a radially inwardly oriented lip 92 and a bore 94 extending therefrom. Bore 94 is slightly smaller in diameter than opening 90, thereby defining lip 92. One or more annular ring 96, 98 is provided on lip 92, two such annular rings 96, 98 being illustrated in the exemplary embodiment. Rings and 96, 98 project from an upper surface of lip 92 toward opening 90. It should be understood that the aforedescribed structures for opening 90, lip 92 and bore 94 can be provided in a top or cover portion of battery 12, or at another convenient location in another suitable outer element of battery 12 or other fluid container.

Figure 4:
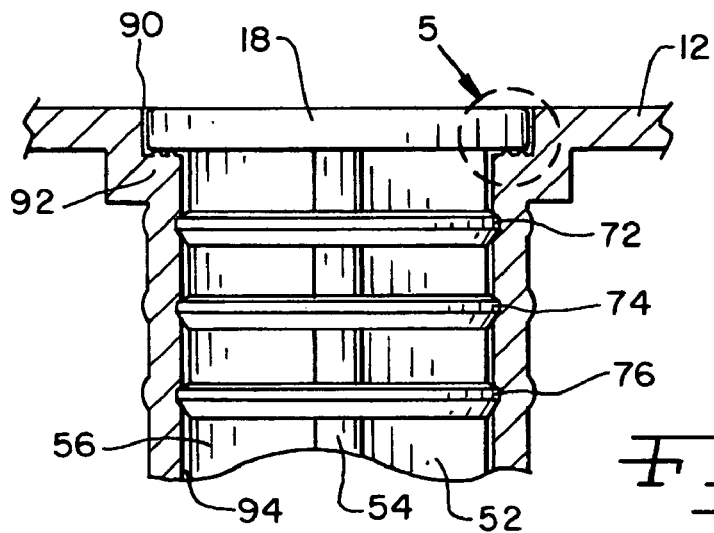
FIG. 4 is a cross-sectional view of a battery condition indicator as shown FIG. 1, but shown installed in a battery.
Figure 5:
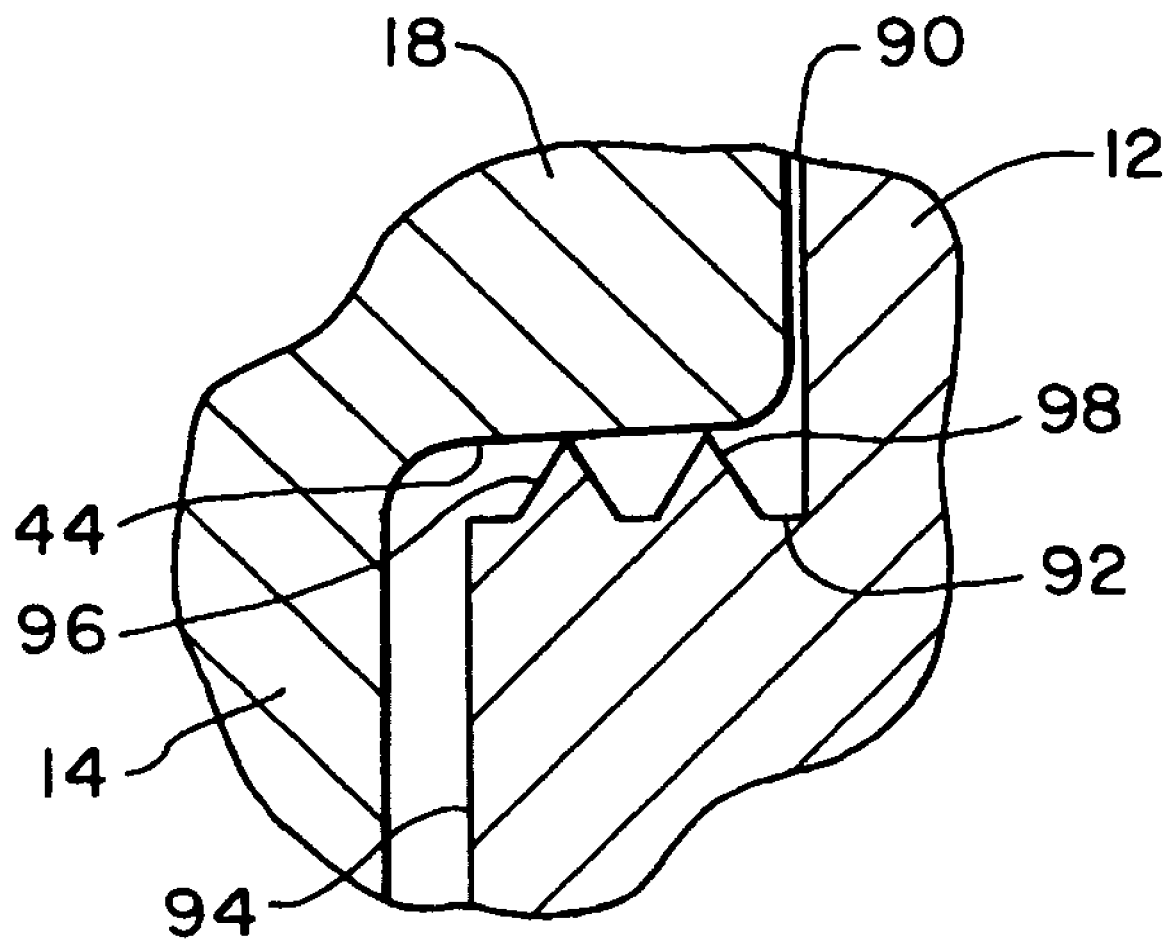
FIG. 5 is an enlarged view of the portion of the indicator and battery within the circle designated with the number 5 in FIG. 4.

Sealing plates 62, 64, 66 are of slightly narrower diameter than head 18 to slide past lip 92 and into bore 94 while head 18, and more specifically undersurface 44 thereof, engages lip 92. However, bore 94 and the diameters of seal plates 62, 64, 66 are selected to provide a sealing interference fit of seal plates 62, 64, and 66 against the surface of bore 94. In one form of the invention, battery cover 92 is of material softer than light transmissive body 14, and seal plates 62, 64 and 66 are of a diameter larger than bore 94 such that seal plates 62, 64, 66 and more specifically the outer edges or ribs 72, 74, 76 thereof embed at least partly in the surface of bore 94, as illustrated in FIG. 4. Accordingly, body 18, and more specifically seal plates 62, 64, 66 may be made of a rigid, clear polymer, such as an acrylic polymer, and battery cover 12 may be made of softer material, such as polypropylene. The shapes of ribs 72, 74, 76, with lead-in faces 82 that are sloped more gradually and trailing faces 84 that are sloped more abruptly, facilitate insertion of indicator 10 while inhibiting withdrawal or dislodgement after indicator 10 is firmly seated relative to battery 12.

Under surface 44 of head 18 confronts and rests against lip 92, and, more specifically, on annular ribs 96, 98. Ribs 96, 98 can be sufficiently narrow so as to crush slightly upon insertion of indicator 10 into battery cover 12. Crushing or deflection of ribs 96, 98 promote effective sealing engagement of the ribs against under surface 44. Once inserted, with head 18 forced against ribs 96, 98 to slightly crush ribs 96, 98, the position will be maintained as seal plates 62, 64, 66 embed into the material of cover 12 along bore 94. If a crush rib or crush ribs 96, 98 are used without seal plates 62, 64, 66 a snap locking feature between indicator 10 and a battery 12 can be used to secure the position of indicator 10 in battery 12, with head 18 against the one or more crush rib 96, 98. Ribs 96, 98 establish a barrier to the migration of contaminants or flow of fluids past lip 92, including leakage from the battery and/or infiltration of an external fluid, including wash water.

While shown and described herein for use and application in a vehicle battery, it should be understood that the present invention also can be used for other types of fluid containers requiring the installation and sealing of an indicator or insert of some type. Use for vehicle batteries is merely one advantageous application of the present invention.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A fluid container comprising:
    an outer element defining an opening;
    an indicator for indicating a condition of a fluid in said container, said indicator being disposed in said opening, said indicator including a response assembly, an indicator head at which exhibited changes are visualized and a light transmissive body connecting said response assembly and said indicator head;
    sealing structures established between said indicator and said outer element including a plurality of ribs integral with at least one of said indicator and said outer element;
    said indicator head and said indicator body being made of a first material and said outer element being made of a second material, said second material being softer than said first material;
    said plurality of ribs including a rib at least one of embedded in said outer element and crushed by said indicator;
    said sealing structure including a plurality of ribs on said indicator embedded in said outer element; and
    said sealing structure including annular ribs in said opening at least partly crushed by said indicator.

2. The fluid container of claim 1, said ribs being circumferential ribs on said body between said head and said response assembly.

3. The fluid container of claim 1, said outer element defining a lip and said annular ribs being disposed on said lip.

4. The fluid container of claim 3, said ribs being circumferential ribs on said body between said head and said response assembly.

5. The fluid container of claim 1, said outer element defining a radially inwardly directed lip inwardly from said opening and a bore narrower then said opening extending way from said lip, and at least one annular rib on said lip extending from said lip toward said opening.

6. The fluid container of claim 5, said head disposed against said at least one annular rib.

7. A fluid container comprising:
    an outer element defining an opening;
    an indicator for indicating a condition of a fluid in said container, said indicator being disposed in said opening, said indicator including a response assembly, an indicator head at which exhibited changes are visualized and a light transmissive body connecting said response assembly and said indicator head;
    sealing structures established between said indicator and said outer element including a plurality of ribs integral with at least one of said indicator and said outer element;
    said indicator head and said indicator body being made of a first material and said outer element being made of a second material, said second material being softer than said first material;
    said plurality of ribs including a rib at least one of embedded in said outer element and crushed by said indicator; and
    said sealing structure including circumferential ribs on said light transmissive body embedded in said outer element and annular ribs defined by said outer element at least partly crushed by said indicator.

8. The fluid container of claim 7, said outer element defining a radially inwardly directed lip inwardly from said opening and a bore narrower then said opening extending away from said lip, and at least one annular rib on said lip extending from said lip toward said opening; and said circumferential ribs on said light transmissive body being embedded in a surface defining said bore.

9. The fluid container of claim 8, said head disposed against said at least one annular rib on said lip.

10. A battery condition indicator comprising:
    a response assembly;
    a light transmissive body attached to said response assembly, said body including four wings in cruciate form;
    a head at an end of said light transmissive body opposite said response assembly; and
    at least one circumferential sealing ribs disposed on said body between said head and said response assembly, said at least one rib including an outermost sealing surface, a lead-in face adjacent said sealing surface and directed toward said response assembly, and a trailing face adjacent said sealing surface and directed toward said head, said lead-in face being sloped more gradually than said trailing face.

11. The indicator of claim 10, including a plurality of sealing plates each defining a different said sealing rib encircling said body and gussets between adjacent pairs of said wings.

12. The indicator of claim 11, said sealing plates and said wings being a monolithic body.

13. The indicator of claim 12, said head having a diameter greater than a diameter of said circumferential sealing ribs.

14. A vehicle battery comprising:
- a battery cover defining an opening, a lip inwardly of an outer surface of said opening, and a bore extending through said cover from said lip;
- at least one annular rib disposed on said lip directed toward said opening;
- an electrolyte conditions indicator disposed in said cover, said indicator including a head disposed against said at least one annular rib on said lip and a body extending inwardly in said battery from said head, said indicator body including at least one circumferential rib at least partly embedded in said cover within said bore; and said indicator body including a plurality of circumferential ribs embedded in said cover within said bore.

15. A vehicle battery comprising:
- a battery cover defining an opening, a lip inwardly of an outer surface of said opening, and a bore extending through said cover from said lip;
- at least one annular rib disposed on said lip directed toward said opening;
- an electrolyte conditions indicator disposed in said cover, said indicator including a head disposed against said at least one annular rib on said lip and a body extending inwardly in said battery from said head, said indicator body including at least one circumferential rib at least partly embedded in said cover within said bore; and
- including a plurality of annular ribs disposed on said lip directed toward said opening and engaged by said head.

16. The battery of claim 15, said indicator body including a plurality of circumferential ribs at least partly embedded in said cover within said bore.

* * * * *